(12) United States Patent
Bordeaux

(10) Patent No.: US 6,808,797 B1
(45) Date of Patent: Oct. 26, 2004

(54) INTERLAYER AND LAMINATED GLASS PANEL COMPRISING SAME

(75) Inventor: Frédéric Bordeaux, Compiegne (FR)

(73) Assignee: Saint-Gobain Glass France, Courbevoie (FR)

(*) Notice: Subject to any disclaimer, the term of this patent is extended or adjusted under 35 U.S.C. 154(b) by 50 days.

(21) Appl. No.: 10/149,742

(22) PCT Filed: Aug. 30, 2000

(86) PCT No.: PCT/FR00/02405

§ 371 (c)(1),
(2), (4) Date: Jun. 12, 2002

(87) PCT Pub. No.: WO01/17769

PCT Pub. Date: Mar. 15, 2001

(30) Foreign Application Priority Data

Sep. 3, 1999 (FR) .............................. 99 11047

(51) Int. Cl.$^7$ .............................. B32B 27/12
(52) U.S. Cl. .............................. 428/292.1; 428/300.4; 428/300.7; 428/480; 428/430
(58) Field of Search .......................... 428/300.4, 300.7, 428/212, 480, 430, 437, 34

(56) References Cited

U.S. PATENT DOCUMENTS

| | | | | |
|---|---|---|---|---|
| 4,047,351 A | * | 9/1977 | Derner et al. ............ 52/786.13 |
| 4,243,719 A | * | 1/1981 | Holmes ...................... 340/550 |
| 4,251,591 A | * | 2/1981 | Chi .......................... 428/316.6 |
| 4,614,676 A | * | 9/1986 | Rehfeld ....................... 428/34 |
| 4,642,255 A | | 2/1987 | Dlubak ........................ 428/38 |
| 5,147,485 A | | 9/1992 | Gajewski et al. ........... 156/104 |
| 5,484,657 A | * | 1/1996 | Kramling et al. ........... 428/426 |
| 5,846,363 A | | 12/1998 | Haverkamp ............. 156/106 |
| 5,908,704 A | * | 6/1999 | Friedman et al. ........... 428/426 |
| 5,979,932 A | | 11/1999 | Jourdaine et al. ........ 280/730.2 |
| 6,074,732 A | | 6/2000 | Garnier et al. .............. 428/215 |
| 6,352,754 B1 | * | 3/2002 | Frost et al. ................... 428/77 |
| 6,432,522 B1 | * | 8/2002 | Friedman et al. ........... 428/212 |

FOREIGN PATENT DOCUMENTS

| | | |
|---|---|---|
| DE | 196 39 350 A1 | 1/1998 |
| DE | 196 32 616 A1 | 2/1998 |
| DE | 197 05 586 C1 | 4/1998 |
| EP | 0 852 999 A2 | 7/1998 |
| JP | 60-103055 | 6/1985 |
| WO | WO 98/26927 | 6/1998 |

* cited by examiner

*Primary Examiner*—Deborah Jones
*Assistant Examiner*—G. Blackwell-Rudasill
(74) *Attorney, Agent, or Firm*—Oblon, Spivak, McClelland, Maier & Neustadt, P.C.

(57) ABSTRACT

The invention relates to an interlayer for use with a laminated glazing. The interlayer may be formed from at least two sheets of polyvinyl butyral provided with a reinforcement inserted therebetween, with the elastic energy needed to deform the interlayer in tension being at least 80 J/m$^2$ in all directions.

17 Claims, 1 Drawing Sheet

INTERLAYER AND LAMINATED GLASS PANEL COMPRISING SAME

FIELD OF THE INVENTION

The invention relates to interlayers used for the production of laminated glazing intended for fitting into motor vehicles. Such glazing usually consists of two glass sheets separated from each other by a plastic interlayer, such as a sheet of polyvinyl butyral (PVB).

More particularly, although the invention is not limited to such applications, it applies to side windows linked to "raising-lowering" systems defining a sliding movement of the said windows in the doors of motor vehicles.

BACKGROUND OF THE INVENTION

Usually, such side windows consist of a sheet of so-called "safety" or "security" glass, that is to say glass meeting European Regulation No. 43. Such windows have weaknesses with regard to the actual security of the vehicle since it is possible to break such windows and get inside the vehicle, either to steal the vehicle or to remove articles or accessories from the passenger compartment.

For a number of years now, anti-theft systems have been developed either in the form of an audible alarm or which allow the vehicle to be immobilized. Although such systems may possibly prevent the vehicle from being stolen, they are often ineffective against a simple break-in, by smashing the window in order to steal articles left in the passenger compartment.

In order to respond to and prevent this type of break-in, it has already been proposed to use laminated glazing consisting, for example, of two glass sheets separated by a plastic interlayer, as mentioned above.

The use of such laminated glazing is advantageous for solving the security problem. This is because the presence of the plastic sheet enormously complicates the breaking of the glass; in the case of laminated glazing comprising two glass sheets separated from each other by a sheet of PVB, when one or both glass sheets are broken, the laminated structure remains in place, the broken glass sheets remaining fast to the interlayer.

However, in the event of an attempted break-in, during which an individual attempts using a tool to smash the laminated glazing by repeated blows, it may happen that the glazing becomes deformed such that the edges of the latter come free of the lateral jambs into which it is set. This is more particularly true in the case of opening windows, such as those which slide vertically in the doors of motor vehicles; in the closed position, the lateral parts and the top of the window are not fixed to the door frame but set in the guide rails and the top of the frame. A large and repeated compressive force using a blunt instrument, such as a club or baseball bat, may thus result in the deformation of the window, which bends and comes free of the door frame, at least on one of its sides. It then merely remains to push or pull the window in order to expose an opening into the interior of the vehicle.

To limit or retard the deformation of such a window, when one or both glass panes are broken, it has already been envisaged to use a rigid interlayer which has a high flexural strength and therefore prevents the window from bending. However, such interlayers have large thicknesses which make them incompatible with the applications in question or at the very least require very significant modification to the door frames. The inventors were thus tasked with the objective to produce an interlayer consisting of at least one soft plastic film, as opposed to the abovementioned rigid interlayers, for the purpose of producing laminated glazing that can be used as a motor-vehicle window in standard structures, the said interlayer increasing the resistance of the window to deformation, or in other words increasing its "residual rigidity".

SUMMARY OF THE INVENTION

The present invention relates to an interlayer for a laminated glazing, consisting of at least two sheets of polyvinyl butyral (PVB), a reinforcement being inserted between the said two sheets of PVB, the said reinforcement giving the interlayer a tensile strength such that the elastic energy ($Et_r$) needed to deform the interlayer in tension is at least 80 J/m², in all directions in the plane of the interlayer.

Preferably, this elastic energy $Et_r$ is greater than 120 J/m².

This elastic energy needed to deform the interlayer in tension, which illustrates the tensile strength of the interlayer, is expressed in the following way:

$$Et_r = \sigma_e^2 X / 2Y \qquad (I)$$

with $\sigma_e$: tensile yield strength of the reinforcement,
Y: Young's modulus
x: cross section of the reinforcement per unit length.

The elastic energy $Et_r$ of a sheet of PVB having a standard thickness for producing laminated glazing intended for motor-vehicle applications is very small and virtually equal to 0 J/m².

Unlike the techniques envisaged hitherto, the interlayer has an almost non-existent flexural strength, yet it makes it possible to limit the deformation of the laminated window broken when pressure is exerted on it, because of the increase in its tensile strength, or more precisely because of the higher value of the elastic energy needed to deform the interlayer in tension.

In fact, during their studies the inventors have been able to demonstrate that, as soon as breakage of the glass sheet occurs, at least two pieces or fragments of glass are formed in the region where the force is exerted. The boundary or line separating these two pieces becomes a site of flexure allowing the window to deform. However, as soon as this deformation occurs, the two pieces of glass bear against each other and this results, since the interlayer remains fast to the glass sheets, in the said interlayer being stressed in tension, at least in one direction, and not only in bending.

According to a first embodiment of the invention, the reinforcement inserted between the sheets of PVB consists of yarns, such as glass yarns or nylon yarns, arranged in at least two directions, for example in order to form a grid or mesh.

In the case of such a reinforcement, the parameter x in formula (I) for $Et_r$ is such that $x = \Pi r^2 n$:
with
r: radius of the yarn
n: number of yarns present per unit length.

According to another embodiment of the invention, the reinforcement inserted between the sheets of PVB consists of a polyester film, such as a polyethylene terephthalate (PET) film having a thickness of greater than 70 μm.

According to this embodiment, the parameter x in formula (I) for $Et_r$ is equal to the thickness of the sheet or film of the reinforcement.

The use of a polyethylene terephtalate film has in particular the advantage of possessing a tensile strength which remains high over a wide temperature range, at least up to 50° C.

Advantageously, the reinforcement consists of the combination of at least two polyester films. This embodiment makes it possible in particular to retain good developability of the reinforcement in the form of film, when it is desired to increase the thickness of the said film in order to further improve the tensile strength. This is because increasing the thickness of such a film increases its stiffness and makes its developability less certain, especially if the window has a significant sphericity. The association or combination of two films results substantially in the same reinforcement in terms of tensile strength as a film having a thickness equal to the sum of the thicknesses of the two films in question and each of the films still having a developability compatible with windows having possibly very pronounced sphericities.

Also preferably, in the case of two polyester films joined together, these are separated by a sheet of PVB which ensures good cohesion of the assembly.

The invention also proposes laminated glazing consisting of at least two glass sheets and of an interlayer as described above having a tensile strength such that the elastic energy needed to deform it in tension is at least 80 J/m² in all directions in the plane of the said interlayer.

Such laminated glazing therefore comprises two glass sheets which form the outer surfaces of the glazing and between which the interlayer may consist of two sheets of PVB between which a reinforcement, for example a PET film, as inserted.

Advantageously, the glazing comprises two glass sheets, so that the glazing according to the invention has firstly a good resistance to deformation in the case, as described above, of a thrust force exerted by a blunt instrument, for example on the glass sheet forming the outer surface of the glazing fitted into the frame of an opening, and secondly such glazing also makes it possible to have a satisfactory resistance to deformation in the case of a tensile force exerted on the glazing, for example using an instrument which, after having passed through the glazing, bears on the inner glass sheet and can exert a tensile force resulting in deformation of the glazing. In the latter case, the inner glass sheet breaks and it is the pieces of glass resulting from this glass sheet which, by bearing on each other, transforms the force exerted on the glazing by the instrument into a tensile force which is exerted on the interlayer.

Laminated glazing comprising two glass sheets therefore provides a better defense against attempted break-ins since it makes it possible to withstand thrust or tensile forces exerted, the direction of the forces being the same, that is to say approximately perpendicular to the plane tangent to the glazing at the point where the said force is exerted.

According to embodiments of the invention, such laminated glazing is fitted into the sides of a motor vehicle and is mounted so as to be able to move. In fact, the need to offer resistance to deformation of the glazing, when the glass sheets have been broken, is all the greater when the glass sheets are not fastened to the frame, for example by adhesive bonding, but simply set, at least in the lateral parts, in the jambs of the frame of the aperture closed off by the said glazing. Such an arrangement actually allows the glazing to be removed from its position in the event of deformation of the glazing, the latter not being retained along its lateral parts.

According to another embodiment, the glazing is curved in at least one direction.

According to a preferred embodiment of the invention, the glass sheets have a thickness of between 1 and 3 mm. For smaller thicknesses, it seems that the effect of the pieces of glass bearing against each other when the glass sheet is broken only occurs under certain fracture conditions. Above 3 mm, the laminated glazing according to the invention is satisfactory, but in the case of glazing intended for motor vehicles, it is then necessary to modify the door frames into which the glazing is fitted, because of the thickness, since at the present time the said frames are designed for non-laminated glazing.

The invention also provides a method of reinforcing the tensile strength of an interlayer consisting of at least two sheets of PVB intended to equip laminated glazing in which a material, such as a polyester film, is inserted between the two sheets of PVB.

BRIEF DESCRIPTION OF THE DRAWINGS

Further details and advantageous characteristics of the invention will emerge below from the description of the illustrative example and from comparative tests, with reference to FIGS. 1, 2 and 3 which show.

DETAILED DESCRIPTION OF THE INVENTION

The tests carried out consisted in making laminated glazing using known techniques and in measuring its flexural strength or residual stiffness, so as to demonstrate the effectiveness of the invention.

The first tests consisted in producing laminated glazing consisting of two glass sheets 2.1 mm in thickness, separated by two sheets of PVB (polyvinyl butyral) 0.38 mm in thickness, between which the reinforcement is inserted.

Figure 1:
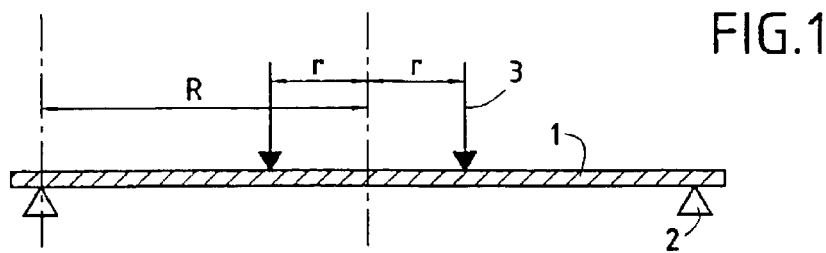
FIG. 1 shows a test device for the bending stresses.

Bending tests were then carried out on an INSTRON 1204 machine. The tests consist in stressing 300 mm wide square specimens in biaxial circular bending. The device used is shown in FIG. 1. This device consists in depositing the glazing 1 on an annular support 2, having a radius R (137.5 mm), and in exerting pressure at the centre of the glazing 1 using a ring 3, having a radius r (87.5 mm), the latter acting concentrically with respect to the annular support 2. The rate of displacement of the ring 3 is 5 mm/min. The tests are carried out at room temperature.

Figure 2:
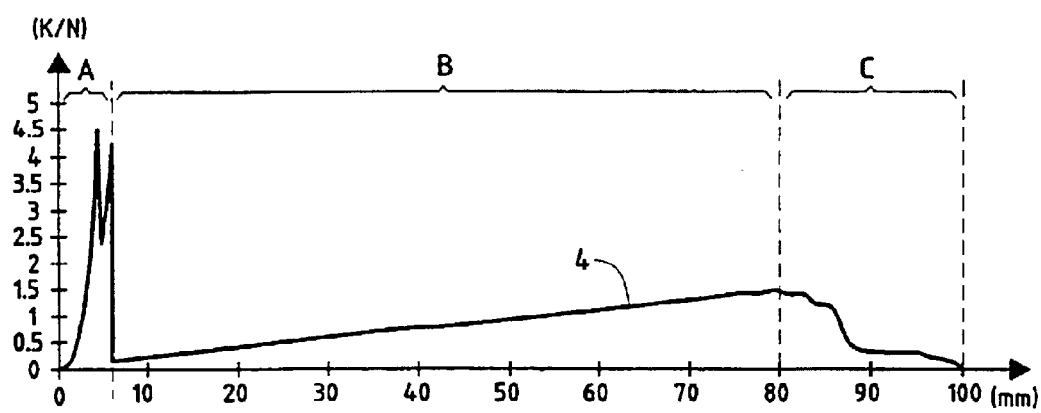
FIG. 2 shows an example of a measurement obtained in this test.

During the test, the force exerted by the ring 3 on the glazing is measured as a function of the displacement of the said ring along the vertical axis. An example of the result is illustrated in FIG. 2, which shows a curve 4 of the force, expressed in kN, exerted on the glazing 3 as a function of the displacement of the ring 3, expressed in millimeters. Three regions A, B and C may be seen in this curve 4. Region A concerns the successive fractures of the two glass sheets. Region B illustrates the deformation of the broken laminated glazing and region C starts with the tearing or fracture of the interlayer.

In the analysis of the invention, only region B, associated with the residual stiffness of the laminated glazing and with the resistance to deformation of the interlayer, is of interest; this region B corresponds to a displacement of the ring 3 of between 8 and 80 mm in the case of the example illustrated in FIG. 2. The inventors have considered that the important parameter used to compare the residual stiffnesses of various laminated glazing panels having various types of interlayer, or more precisely various types of reinforcement, is the energy needed to deform the broken glazing from 8 to 18 mm. The value of 18 mm was chosen in order to define a value sufficiently representative of the deformation energy.

This energy, which corresponds to the area under curve 4 between the 8 and 18 abscissae, is expressed in the following manner:

$$E = \int_8^{18} F \, dl \quad (II)$$

with

F: expressed in kN, l: expressed in mm, and

E: expressed in J.

Various laminated glazing panels were produced, and for each of them a measurement according to the technique illustrated in FIG. 1 was carried out in order to determine the residual stiffness of these glazing panels in bending.

The table which follows gives the values of the energy E needed to deform the glazing, calculated from the results obtained and from formula (II) for laminated glazing having various types of reinforcement.

The reinforcements of the various glazing panels tested are as follows:

| REINFORCEMENT No. | NATURE OF THE REINFORCEMENT |
|---|---|
| 1 | None (therefore just an interlayer consisting of 0.76 mm of PVB) |
| 2 | 0.1 mm glass film |
| 3 | 0.7 mm glass film |
| 4 | 1 mm glass film |
| 5 | PET film 50 μm in thickness |
| 6 | PET film 80 μm in thickness |
| 7 | PET film 100 μm in thickness |
| 8 | PET film 150 μm in thickness |
| 9 | 2 PET films 80 μm in thickness separated by a 0.38 mm PVB sheet |
| 10 | PET film 240 μm in thickness |
| 11 | Rovings consisting of 200 glass fibres 9 μm in diameter, distributed in two perpendicular directions with a spacing of 10 mm |
| 12 | Rovings consisting of 200 glass fibres 9 μm in diameter, distributed in two perpendicular directions with a spacing of 7.5 mm |
| 13 | Rovings consisting of 200 glass fibres 9 μm in diameter, distributed in two perpendicular directions with a spacing of 5 mm |

The table which follows furthermore gives the value of $Et_r$ (tensile elastic energy needed to deform the interlayer) and the various characteristics allowing it to be calculated from formula (I):

| REINFORCEMENT No. | E (J) | $\sigma_e$ (Mpa) | Y (Mpa) | X (mm) | $Et_r$ (J/m²) |
|---|---|---|---|---|---|
| 1 | 2.9 | — | — | — | — |
| 2 | 2.7 | 100 | 73000 | 0.10 | 6.8 |
| 3 | 4.8 | 100 | 73000 | 0.70 | 47.9 |
| 4 | 7.2 | 100 | 73000 | 1.00 | 68.5 |
| 5 | 8.6 | 80 | 3000 | 0.05 | 53.3 |
| 6 | 13.7 | 80 | 3000 | 0.08 | 85.3 |
| 7 | 12.2 | 80 | 3000 | 0.10 | 106.7 |
| 8 | 20.6 | 80 | 3000 | 0.15 | 160 |
| 9 | 25.3 | 80 | 3000 | 0.16 | 170.7 |
| 10 | 25.1 | 80 | 3000 | 0.24 | 256 |
| 11 | 6.7 | 2400 | 73000 | 0.00127 | 50.2 |
| 12 | 7.7 | 2400 | 73000 | 0.0017 | 66.9 |
| 13 | 11 | 2400 | 73000 | 0.0025 | 100.4 |

The value of $Et_r$ and that of the various parameters of the first test are not given, since the mechanical properties of the PVB, which is a viscoelastic material, depend on temperature and time.

Rapid analysis of the second column demonstrates that the insertion of a reinforcement between the two sheets of PVB, the particular purpose of which is to improve the tensile strength of the interlayer, gives the laminated glazing the energy needed to deform the broken glass from 8 to 18 mm, and therefore an improved residual stiffness.

Figure 3:
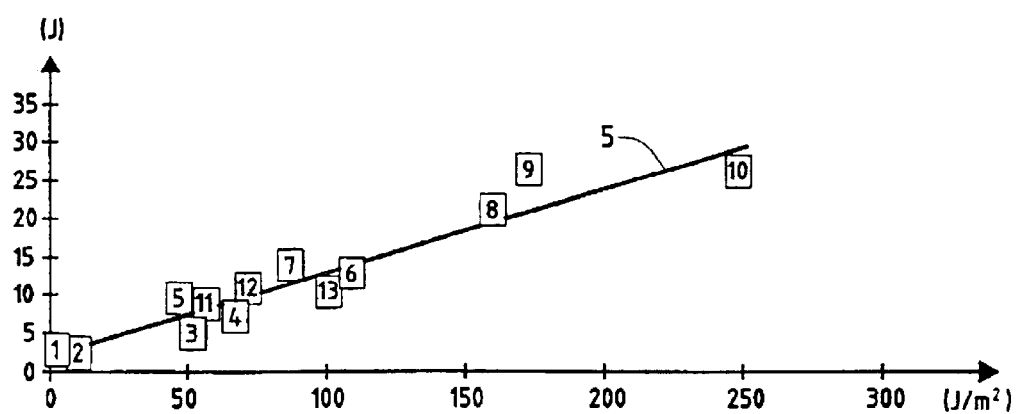
FIG. 3 shows the results presented in graph form illustrating the energy needed to deform broken laminated glazing according to the invention, as a function of the elastic energy per unit area needed to deform the interlayer in tension.

Moreover, plotted in FIG. 3 are the points of the function f such that $E = f(Et_r)$ corresponding to Tests 1 to 13, that is to say a graphical representation of the energy (E) needed to deform the broken glass in bending as a function of the elastic energy ($Et_r$) needed to deform the interlayer in tension has been plotted. The various points are indicated by the number of the reinforcement written in a rectangle.

It turns out, as illustrated in FIG. 3, that this function f is approximately linear, as shown by the straight line 5, and therefore that the energy E, or more precisely the residual stiffness, is essentially a function of the energy $Et_r$ and therefore of the tensile strength of the interlayer, and more precisely of the reinforcement.

The minimum value of 80 J/m² according to the invention corresponds approximately to an energy of 10 J to deform the laminated glazing in bending, which already corresponds to a significant energy provided by a blunt instrument which strikes a window of standard size fitted into the frame of a door, when it is handled by an individual of average corpulence.

Further tests have consisted in varying the thickness of two glass sheets forming the outer surfaces of the laminated glazing.

These tests have shown that excessively small thicknesses, that is to say less than 1 mm, lead to results which are no longer in agreement with the invention. The inventors explain these results by the fact that the pieces of glass resulting from breaking the glass panes are not thick enough to bear against each other and to convert the force, resulting in the glazing bending under a tensile force exerted on the interlayer in the plane of the latter.

What is claimed is:

1. An interlayer for a laminated glazing, the interlayer comprising a pair of outer sheets formed from polyvinyl butyral and a reinforcement, which is a grid-like or mesh pattern of yarn arranged in at least two different directions, disposed therebetween, the interlayer having a tensile strength such that the elastic energy needed to deform the interlayer is at least about 80 J/m² in all directions.

2. The interlayer of claim 1, wherein the yarn is selected from the group consisting of glass yarn and nylon yarn.

3. The interlayer of claim 1, wherein the elastic energy ($Et_r$) is determined by the formula:

$$Et_r = \sigma_e^2 \pi r^2 n / 2Y$$

wherein $\sigma_e$ is tensile yield strength,

Y is Young's modulus, r is the radius of the yarn, and n is the number of yarns per unit length.

4. An interlayer for a laminated glazing, the interlayer comprising a pair of outer sheets formed from polyvinyl butyral and a reinforcement consisting of (1) at least one polyester film having a thickness greater than 70 μm or (2) two polyester films separated by a PVB sheet, disposed therebetween, the interlayer having a tensile strength such that the elastic energy needed to deform the interlayer is at least about 80 J/m² in all directions.

5. The interlayer of claim 4, wherein said thickness is at least 80 μm.

6. The interlayer of claim 4, wherein the polyester is polyethylene terephthalate.

7. The interlayer of claim 6, wherein the interlayer comprises two polyethylene terephthalate films.

8. A laminated glazing, comprising:

a pair of glass sheets and an interlayer comprising a pair of outer sheets formed from polyvinyl butyral and a reinforcement, which is a grid-like or mesh pattern of yarn arranged in at least two different directions, disposed therebetween, the interlayer having a tensile strength such that the elastic energy needed to deform the interlayer is at least about 80 J/m² in all directions.

9. The laminated glazing of claim 8, wherein the glazing is configured and dimensioned as a movable glazing for a vehicle.

10. The laminated glazing of claim 8, wherein the glazing is curved in at least one direction.

11. The laminated glazing of claim 8, wherein the glass sheets have a thickness ranging from about 1 mm to about 3 mm.

12. The laminated glazing of claim 8, wherein at least one of the glass sheets comprises at least two glass sheets.

13. A laminated glazing, comprising:

an interlayer comprising a pair of outer sheets formed from polyvinyl butyral and a reinforcement consisting of (1) at least one polyester film having a thickness greater than 70 μm or (2) two polyester films separated by a PVB sheet, disposed therebetween, the interlayer having a tensile strength such that the elastic energy needed to deform the interlayer is at least about 80 J/m² in all directions.

14. The laminated glazing of claim 13, wherein the glazing is configured and dimensioned as a movable glazing for a vehicle.

15. The laminated glazing of claim 13, wherein the glazing is curved in at least one direction.

16. The laminated glazing of claim 13, wherein the glass sheets have a thickness ranging from about 1 mm to about 3 mm.

17. The laminated glazing of claim 13, wherein at least one of the glass sheets comprises at least two glass sheets.

* * * * *